US010727922B2

(12) United States Patent
Fang

(10) Patent No.: US 10,727,922 B2
(45) Date of Patent: Jul. 28, 2020

(54) INTEGRATED OFDMA AND EDCA CHANNEL ACCESS MECHANISM

(71) Applicant: ZTE Corporation, Shenzhen (CN)

(72) Inventor: Yonggang Fang, San Diego, CA (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/630,874

(22) Filed: Jun. 22, 2017

(65) Prior Publication Data

US 2017/0373736 A1 Dec. 28, 2017

Related U.S. Application Data

(60) Provisional application No. 62/363,799, filed on Jul. 18, 2016, provisional application No. 62/354,071, filed on Jun. 23, 2016.

(51) Int. Cl.
*H04W 4/00* (2018.01)
*H04B 7/06* (2006.01)
(Continued)

(52) U.S. Cl.
CPC ............ *H04B 7/066* (2013.01); *H04W 74/06* (2013.01); *H04W 74/085* (2013.01); *H04B 7/0452* (2013.01); *H04B 7/2612* (2013.01); *H04L 5/0007* (2013.01); *H04W 52/0229* (2013.01); *H04W 74/002* (2013.01); *H04W 74/0816* (2013.01); *H04W 84/12* (2013.01); *Y02D 70/10* (2018.01); *Y02D 70/14* (2018.01);
(Continued)

(58) Field of Classification Search
CPC .............. H04W 74/06; H04W 74/085; H04W 52/0229; H04W 74/002; H04W 74/0816; H04W 84/12; H04B 7/066; H04B 7/0452; H04B 7/2612
See application file for complete search history.

(56) References Cited

U.S. PATENT DOCUMENTS 7,068,632 B1 6/2006 Ho et al.
7,499,425 B2 3/2009 Yew et al.
(Continued)

FOREIGN PATENT DOCUMENTS

CN 1941666 4/2007
CN 101159648 4/2008
(Continued)

OTHER PUBLICATIONS

International Search Report and Written Opinion dated Oct. 12, 2016 for International Application No. PCT/US2016/039449, filed on Jun. 25, 2016 (10 pages).
(Continued)

*Primary Examiner* — Abdelnabi O Musa
(74) *Attorney, Agent, or Firm* — Perkins Coie LLP

(57) ABSTRACT

Access to a wireless medium is made more flexible by combining the distributed access and central controlled access. A wireless device may be allowed to perform both orthogonal frequency-division multiple access (OFDMA) and enhanced distributed channel access (EDCA) channel access mechanisms at same time and start the channel access via a mechanism that allows a faster access to the channel. Depending on channel acquisition, the wireless device can use a multi-user format or a single-user format to transmit uplink anPLCP protocol data unit (PPDU).

28 Claims, 10 Drawing Sheets

(51) Int. Cl.
*H04W 74/06* (2009.01)
*H04W 74/08* (2009.01)
H04B 7/0452 (2017.01)
H04L 5/00 (2006.01)
H04W 52/02 (2009.01)
H04W 84/12 (2009.01)
H04B 7/26 (2006.01)
H04W 74/00 (2009.01)

(52) U.S. Cl.
CPC ........ *Y02D 70/142* (2018.01); *Y02D 70/444* (2018.01); *Y02D 70/449* (2018.01)

(56) References Cited

U.S. PATENT DOCUMENTS

| | | |
|---|---|---|
| 2003/0161340 A1 | 8/2003 | Sherman |
| 2003/0198244 A1 | 10/2003 | Ho et al. |
| 2008/0112351 A1 | 5/2008 | Surineni et al. |
| 2011/0268054 A1 | 11/2011 | Abraham et al. |
| 2013/0170480 A1 | 7/2013 | Novak et al. |
| 2013/0286959 A1 | 10/2013 | Lou et al. |
| 2014/0119288 A1 | 5/2014 | Zhu et al. |
| 2015/0063258 A1 | 3/2015 | Merlin et al. |
| 2015/0071051 A1 | 3/2015 | Zhu et al. |
| 2015/0078230 A1 | 3/2015 | Choi et al. |
| 2015/0201434 A1 | 7/2015 | Fang et al. |
| 2016/0143010 A1 | 5/2016 | Kenney et al. |
| 2016/0157266 A1 | 6/2016 | Wang et al. |
| 2016/0262185 A1* | 9/2016 | Ghosh ................ H04W 72/04 |
| 2016/0278081 A1 | 9/2016 | Chun et al. |
| 2016/0286548 A1 | 9/2016 | Huang et al. |
| 2016/0360443 A1* | 12/2016 | Hedayat ............... H04B 7/0452 |
| 2017/0150493 A1* | 5/2017 | Seok ................... H04B 7/0452 |
| 2017/0347372 A1* | 11/2017 | Li ..................... H04W 72/1284 |
| 2018/0014316 A1 | 1/2018 | Guo et al. |
| 2018/0027608 A1* | 1/2018 | Oh ....................... H04L 1/1861 370/336 |
| 2018/0035488 A1 | 2/2018 | Yang et al. |
| 2018/0084605 A1 | 3/2018 | Li et al. |
| 2018/0167882 A1* | 6/2018 | Choi ................... H04W 52/02 |
| 2018/0191541 A1 | 7/2018 | Fang et al. |
| 2018/0263047 A1 | 9/2018 | Kim et al. |
| 2019/0289633 A1 | 9/2019 | Fang |

FOREIGN PATENT DOCUMENTS

| | | |
|---|---|---|
| CN | 104320859 | 1/2015 |
| CN | 104780618 A | 7/2015 |
| WO | 2015/068968 A1 | 5/2015 |
| WO | 2015/074461 A1 | 5/2015 |
| WO | 2016/127913 | 8/2016 |
| WO | 2016/163641 | 10/2016 |
| WO | 2016/210389 A1 | 12/2016 |
| WO | 2018/094279 | 5/2018 |

OTHER PUBLICATIONS

International Search Report and Written Opinion dated May 28, 2018 for International Application No. PCT/US2017/062415, filed on Nov. 17, 2017 (13 pages).
International Search Report and Written Opinion dated Sep. 14, 2017 for International Application No. PCT/CN2017/089796, filed on Jun. 23, 2017 (8 pages).
USPTO Non-Final Office Action for U.S. Appl. No. 15/739,676, dated Jul. 16, 2019 (50 pages).
USPTO Notice of Allowance for U.S. Appl. No. 15/739,676, dated Oct. 29, 2019 (22 pages).
SIPO, First Office Action with Search Report for Chinese Application No. 201510015319.6, dated Sep. 30, 2017, with English machine translation.
SIPO, Second Office Action with Search Report for Chinese Application No. 201510015319.6, dated Mar. 8, 2018 (no English translation available).
SIPO, Third Office Action for Chinese Application No. 201510015319.6, dated Sep. 14, 2018, with English machine translation.
SIPO, First Office Action with Search Report for Chinese Application No. 201780052053, dated Feb. 25, 2020, with English machine translation.
USPTO Non-Final Office Action for U.S. Appl. No. 14/596,150, dated Nov. 4, 2016, 25 pages.
USPTO Notice of Allowance for U.S. Appl. No. 14/596,150, dated Mar. 1, 2017, 29 pages.

* cited by examiner

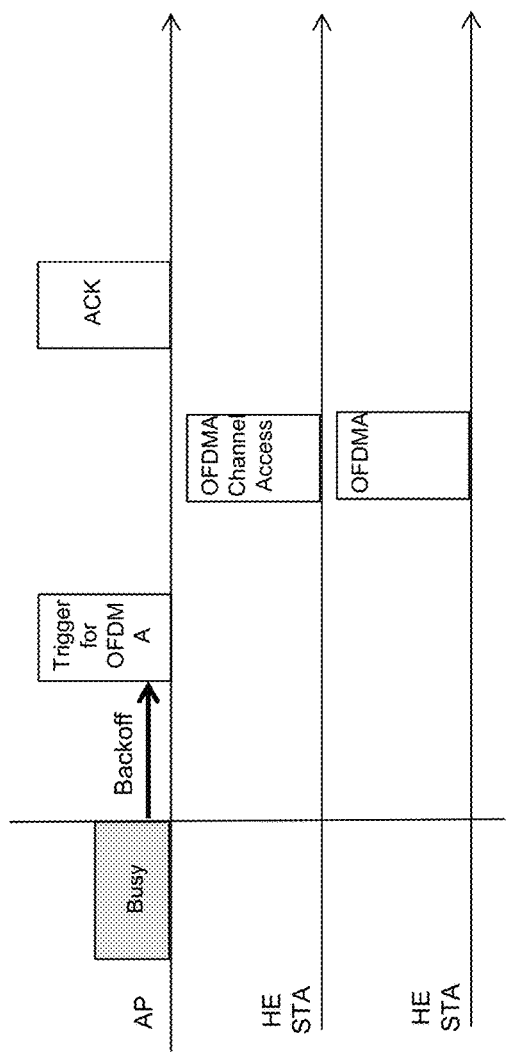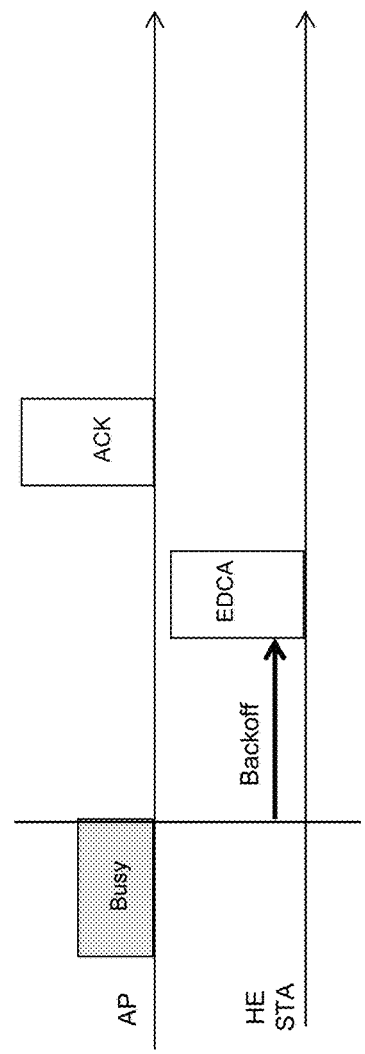
FIG. 3A
FIG. 3B

INTEGRATED OFDMA AND EDCA CHANNEL ACCESS MECHANISM

CROSS REFERENCE TO RELATED APPLICATIONS

This patent document claims the benefit and priority of U.S. Provisional Patent Application No. 62/354,071, filed on Jun. 23, 2016, and U.S. Provisional Patent Application No. 62/363,799, filed on Jul. 18, 2016. The entire contents of the before-mentioned patent applications are incorporated by reference as part of the disclosure of this document.

TECHNICAL FIELD

This patent document relates to wireless communication, and in particular, access to a wireless transmission medium by multiple wireless devices.

BACKGROUND

Wireless communication systems can include a network of one or more access points (AP) to communicate with one or more wireless stations (STA). An access point can emit radio signals that carry management information, control information or users' data to one or more wireless stations, and a station can also transmit radio signals to the access point in the same frequency channel via time division duplexing (TDD) or in different frequency via frequency division duplexing (FDD).

IEEE 802.11 is an asynchronous time division duplexing technology designated for wireless local area network (WLAN) over the unlicensed spectrum. The basic unit of WLAN is a basic service set (BSS). The infrastructure BSS is the BSS with stations through associating with an Access Point (AP) to connect to the wired intranet or Internet. In a BSS, both access point and stations share the same frequency channel via using Carrier Sensing Multiple Access with Collision Avoidance (CSMA/CA) technology, a kind of TDD mechanism, for multiple access and data transmission.

SUMMARY

This patent document describes technologies, among other things, integrated Orthogonal Frequency Division Multiple Access (OFDMA) and Enhanced Distributed Channel Assess (EDCA) channel access mechanism to provide a generic channel access solution for a station to contend the transmission medium.

In some aspects, a method of controlling operation of a wireless network comprising an access point is disclosed. The exemplary method comprises transmitting, by the access point, a beacon frame over a wireless transmission medium, wherein the beacon frame comprises a number of contention window parameters for an uplink multiuser random access transmission, and wherein the number of contention window parameters include a minimum contention window value. The method includes resetting, by the access point, a backoff counter value to a random value between zero and the minimum contention window value, wherein the backoff counter is reset in response to the access point determining that an upcoming transmission time is for an orthogonal frequency division multiplexing access (OFDMA) based channel access. The method includes decreasing, by the access point, the backoff counter value by a predetermined value in response to the access point sensing that the wireless transmission medium is idle. The method includes determining, by the access point, whether the backoff counter value is equal to zero. The method includes transmitting, by the access point, a trigger frame for the OFDMA based channel access in response to the access point determining that the backoff counter value is equal to zero. The method includes receiving, in response to the trigger frame, a PLCP protocol data unit (PPDU). And, the method includes transmitting an acknowledgement when the PPDU is successfully decoded.

In some aspects, the receiving of the PLCP protocol data unit (PPDU) in the exemplary method comprises: monitoring, by the access point, an operating channel to receive trigger response frames from a plurality of wireless stations, wherein each trigger response frame includes a preamble and a PLCP protocol data unit (PPDU); detecting, by the access point, the preamble over the operating channel; and decoding, after detecting the preamble, the PPDUs over a resource unit (RU).

In some aspects, the method further comprises: maintaining, by the access point, the backoff counter value in responses to sensing that the wireless transmission is not idle; and monitoring, by the access point, the wireless transmission medium to determine whether the wireless transmission medium is idle.

In some aspects, the trigger frame of the exemplary method comprises an association identifier (AID), the minimum contention window value, the maximum contention window value, an access category (AC), duration, and resource unit (RU).

In some aspects, the acknowledgement of the exemplary method is a multi-user acknowledgement transmitted over a high-efficiency multi-user PPDU on a resource unit.

In some aspects, the number of contention window parameters of the exemplary method includes a single set of contention window parameters shared by both the enhanced distributed channel access (EDCA) based channel access and the orthogonal frequency division multiplexing access (OFDMA) based channel access.

In some aspects, the exemplary method further includes duplicating, by the access point, the trigger frame for OFDMA based channel access over multiple 20 MHz channels.

In some aspects, the exemplary method further comprises adjusting, by the access point, the contention window parameters in either beacon frame or trigger frame for future OFDMA based channel access, wherein the adjusting of the contention window parameters is in response to the access point not receiving the preamble after a short interframe space (SIFS) time.

In some aspects, an access point is disclosed. The access point includes a processor and a memory having instructions stored thereupon, wherein the instructions upon execution by the processor configures the access point to perform actions disclosed in this document.

In another aspect, a method of wireless communication is disclosed. The exemplary method comprises receiving, by a wireless station, a contention window parameter, wherein the contention window parameter includes a minimum contention window value, and wherein the contention window parameter is associated with an access category of data. The method includes selecting, by the wireless station, a backoff counter value, wherein the backoff counter is associated with the access category of data, and wherein the backoff counter value is selected to have a value between zero and the minimum contention window value. The method includes decreasing, by the wireless station, the backoff counter value based on a medium sensing and decrementing rule. The method includes transmitting, when the backoff counter value reaches zero, a random access transmission using a transmission mechanism that is dependent on a random access flag, wherein the transmission mechanism includes transmitting using a randomly selected resource unit when the random access flag indicates orthogonal frequency division multiplexing access (OFDMA) based channel access, and transmitting using an entire transmission bandwidth of a channel, when the random access flag indicates an enhanced distribution channel access (EDCA) based channel access.

In some aspects, the exemplary method further comprises resetting, by the wireless station, the backoff counter in response to receiving an acknowledgement from the access point.

In some aspects, the medium sensing and decrementing rule for decreasing the backoff counter value comprises: sensing, by the wireless station, the wireless transmission medium; maintaining, by the wireless station, the backoff counter value in response to determining that the wireless transmission medium is busy; decoding, by the wireless station, a PLCP protocol data unit (PPDU) in response to determining that the wireless transmission medium is busy; receiving, by the wireless station, a trigger frame for orthogonal frequency division multiplexing access (OFDMA) based channel access, the trigger frame comprising a number of allocated resource units; decreasing, by the wireless station, the backoff counter value by a number of allocated resource units specified in the trigger frame; and setting, by the wireless station, the random access flag to indicate OFDMA based channel access.

In some aspects, the medium sensing and decrementing rule for decreasing the backoff counter value comprises: sensing, by the wireless station, the wireless transmission medium; decreasing, by the wireless station, the backoff counter value by a predetermined value in response to determining that the wireless transmission medium is not busy; and setting, by the wireless station, the random access flag to indicate EDCA based channel access.

In some aspects, the access category of data includes any one of a background, a best effort, a video, and a voice.

In some aspects, the exemplary method further comprising: setting, by the wireless station, a new contention window parameter to twice that of a previous contention window parameter, wherein the setting of the new contention window is in response to not receiving an acknowledgement from the access point; resetting the backoff counter after setting the new contention window parameter; and sensing the wireless transmission medium after resetting the backoff counter.

In some aspects, a wireless station is disclosed. The wireless station includes a processor and a memory having instructions stored thereupon, wherein the instructions upon execution by the processor configures the wireless station to perform actions disclosed in this document.

In one aspect, a method is provided to trigger the OFDMA based channel access process via transmitting a trigger frame with indication of multi-user channel access transmission for multiple stations using OFDMA technology and setting the duration of transmit opportunity (TXOP) to protect OFDMA procedure from being interfered by other stations.

In another aspect, a method is provided to allow a station to perform both OFDMA and EDCA channel access simultaneously using the same backoff counting mechanism. For the OFDMA based random channel access, the backoff counting tick is the number of resource units allocated for OFDMA channel access in the trigger frame, and for the EDCA, the backoff counting tick is the idle time measured by the clear channel assessment (CCA) mechanism. In this way, the integrated channel access mechanism would provide the fast channel access in the fair contention environment.

In another aspect, a method is provided to start either OFDMA based channel access or EDCA based channel access according to the indication when the backoff counter is reduced to 0.

In another aspect, a method is provided for the AP to configure the periodical trigger frame transmission time in beacon frame so that the stations are able to determine the time for OFDMA based channel access.

In another aspect, a method for quickly adapting to congestion is provided via including the contention window parameters in the trigger frame. Therefore the stations can use the latest contention window parameters in the trigger frame to set their backoff counters for the OFDMA based channel access. The AP can optionally include such information as needed so that stations may not need to wait for beacon frame to get such information for OFDMA based channel access.

In another aspect, a method of dynamic granting the duration for random access is provided by the Duration field in trigger frame, so that the AP can control the OFDMA based channel access duration according to, for example, the traffic load of BSS, SINR, or re-transmission rate.

In yet another aspect, a method of combining OFDMA and EDCA channel access together is provided for AP to be able to fully control random access methods in the congested condition.

Details of the above aspects and their implementations are set forth in the accompanying drawings, the description and the claims.

BRIEF DESCRIPTION OF THE DRAWINGS

FIGS. 3A-3B show examples of integrated OFDMA-EDCA channel access mechanisms.

DETAILED DESCRIPTION

This document describes techniques, mechanisms, devices, and systems for multiple stations to randomly access the wireless transmission medium using the mechanism of OFDMA combining with EDCA to improve transmission efficiency in contention based wireless communications.

In IEEE 802.11, the basic service set (BSS) is the building block of a Wireless Local Area Network (WLAN). Wireless stations (also called stations) associated in the radio coverage area establish a BSS and provide basic service of WLAN.

Figure 1:
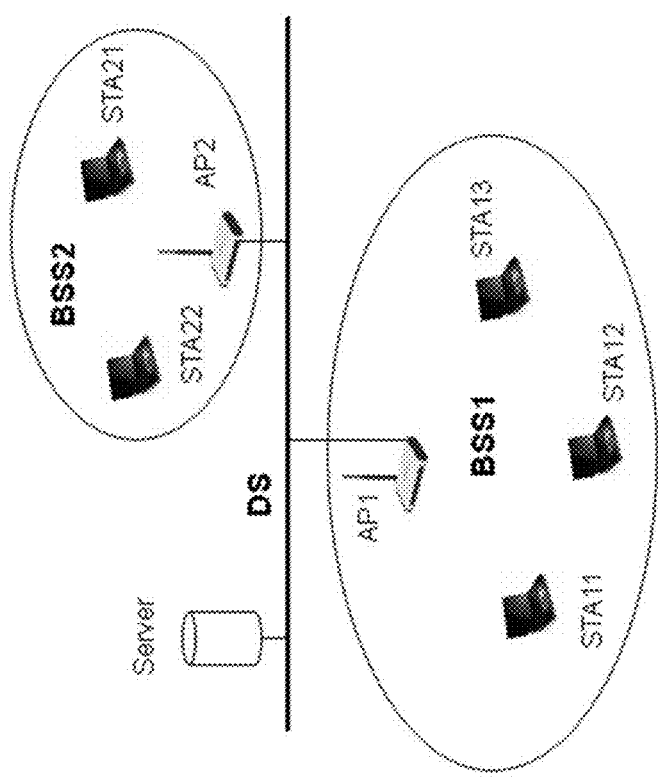
FIG. 1 shows an infrastructure BSS in a wireless communication system.

FIG. 1 illustrates an example of infrastructure BSS. BSS1 and BSS2 are infrastructure BSSes. BSS1 contains one access point (AP1) and several non-AP stations, STA11, STA12, and STA13. The AP1 maintains associations with stations STA11, STA12, and STA13. BSS2 contains one access point (AP2) and two non-AP stations, STA21 and STA22. The AP2 maintains associations with stations STA21 and STA22. Infrastructure BSS1 and BSS2 may be interconnected via the AP1 and AP2 or connected to a server or switch through a distribution system (DS) to form an Extended Service Set (ESS).

Figure 2:
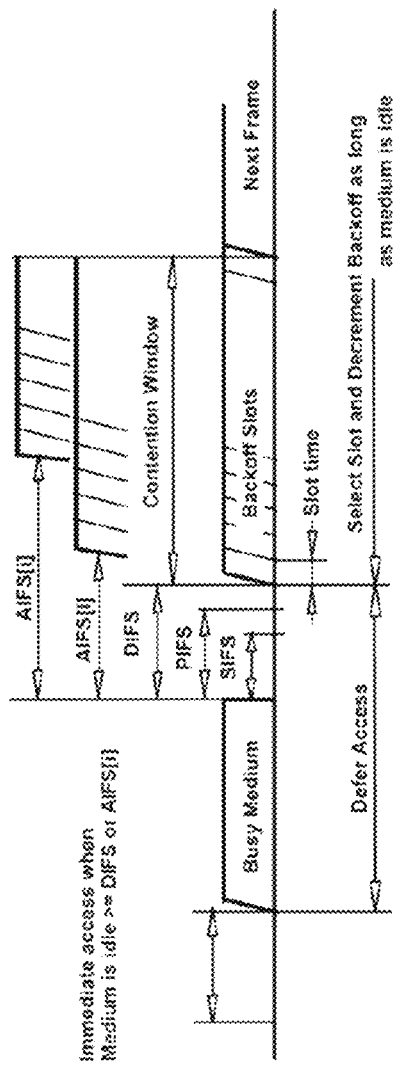
FIG. 2 shows a prior art CSMA/CA mechanism in DCF of IEEE 802.11.

FIG. 2 illustrates an example of a Carrier Sensing Multiple Access with Collision Avoidance (CSMA/CA) mechanism used in the current 802.11 technologies and networks. A station senses the medium before its transmission. If the medium is sensed busy, the station defers its transmission until the medium is determined as idle plus a period of time equal to xIFS, such as the AIFS, EIFS, DIFS, PIFS, or SIFS, when the last frame detected on the medium was received correctly. If the station is going to send a control frame such as ACK, then it has to wait for short interframe space (SIFS) time before transmission. If the station is going to transmit a management frame, it has to wait for the point coordination function (PCF) interframe space (PIFS). If the station is going to transmit the data frame, it has to wait for distributed (coordination function) interframe space (DIFS) or arbitration interframe space (AIFS) or extended interframe space (EIFS) before entering contention window.

The Enhanced Distributed Channel Assess (EDCA) was introduced in IEEE802.11 specification to allow multiple stations to contend the medium and to differentiate different Quality of Service (QoS) traffics during the contention. In the EDCA mechanism, each station selects a random value for the backoff counter (BOC) associated with an access category (AC) to contend the medium:

BOC=Random [0, CW], where CW is the Contention Window initialized at CWmin. CWmin is the minimum contention window size carried in the beacon frame broadcast by the AP.

When the station is going to contend for the medium, it first selects a BOC and senses the medium. If the medium is sensed as busy, the station will remain in the current state and continue monitoring the medium until it becomes idle. If the medium is sensed as idle for an aSlotTime time, it decreases the BOC by one and continues sensing the medium. If the medium is still sensed as idle for an aSlotTime time, the station decreases the BOC by one again until the BOC reaches zero. Once the BOC reaches 0, the station transmits a frame.

After the station transmits a frame, it has to wait for the acknowledgement to confirm the success of the transmission. If the station does not receive the acknowledgement, it means the transmission failed. The station then doubles its CW (CW<=CWmax) and re-select the BOC from [0, CW] and prepare the re-transmission.

The existing EDCA mechanism of IEEE 802.11 has significant overhead in each transmission since it only allows one station to access the medium at one time. If multiple stations contend the medium at same time, it might cause collision. The more stations contending the medium at same time, the more chance of collisions to happen.

In order to reduce the possibility of collision, the CWmin should not be set too small to allow multiple stations to be distributed in relative large contention windows in time domain. However, on the other hand, a large CWmin would increase possibility of idle time during the contention, which would waste medium time and reduce the channel usage efficiency. The more stations contend the medium, the less channel usage efficiency.

The present document discloses a channel access mechanism based on Orthogonal Frequency Division Multiple Access (OFDMA) combining with EDCA. In some embodiments, the disclosed technique can be used to improve the medium utilization efficiency. In some embodiments, the disclosed technique can be used to improve user experience, e.g., by reducing transmission latency for the time sensitive applications.

In one advantageous aspect, the OFDMA-EDCA integrated channel access mechanism combines certain advantages of central control function and distributed control function mechanisms. For example, in some embodiments, the OFDMA mechanism can be implemented as a pre-contention and arbitration procedure before actual occupying the medium for uplink (UL) transmission. The AP can perform EDCA based contention to acquire the medium and transmit a trigger frame to trigger the OFDMA channel access procedure to allow multiple stations to simultaneously access the network using OFDMA channel access mechanism.

In another advantageous aspect, the OFDMA-EDCA integrated random channel access mechanism allows the station to perform the EDCA and OFDMA channel access at same time. If the station senses the medium idle and acquire the channel by EDCA first, the station can transmit the packet using single user (SU) format according to the EDCA mechanism. If the station senses the medium busy and receives a trigger frame for OFDMA random channel access, the station can perform the channel access over one OFDMA sub-channel using a multiple user (MU) transmission format. In this way, the station would be able to take the earliest transmission opportunity to send out the packet.

In some embodiments, instead of contending for the medium in time domain by EDCA, OFDMA random access mechanism manages the stations' contention in the both time and frequency domains, so as to reduce the waiting time in idle state while reducing the probability of collisions to a certain level.

In some embodiments, instead of judging the medium occupancy by contending stations themselves, the OFDMA based channel access mechanism allows multiple stations to contend the medium simultaneously and lets the AP control UL transmissions from multiple stations in the following transmissions to further reduce the probability of collisions. The AP can schedule sequential transmission for those stations via Single User (SU) PLCP protocol data unit (PPDU) or parallel transmissions via trigger based Multi-User (MU) OFDMA or MU MIMO format.

In some embodiments, the AP can control and balance the medium access between legacy EDCA only stations and OFDMA-EDCA integrated stations. Through the transmission of trigger frames, the AP could adjust the number of OFDMA-EDCA integrated stations to perform the OFDMA based channel access vs EDCA channel access.

In some embodiments, the OFDMA-EDCA integrated channel access mechanism can apply and support the power saving mechanism. The AP could periodically broadcast the target transmission time of trigger frame for OFDMA based channel access in the beacon frame. OFDMA-EDCA integrated stations can get the information of the target transmission time of trigger frame in the beacon frames and could sleep most of time if they do not have a delay sensitive data to send. The OFDMA-EDCA integrated stations can wakeup just before the time of trigger frame arrival for catching up the OFDMA based channel access.

FIGS. 3A-3B show examples of integrated OFDMA-EDCA channel access mechanisms. The integrated OFDMA-EDCA channel access mechanism contains two independent channel access mechanisms: OFDMA and EDCA with shared backoff counting mechanism.

FIG. 3A shows that the OFDMA channel access mechanism, which is a central controlled channel access from multiple stations. This mechanism allows the multiple stations to contend the medium at same time over OFDMA sub-channels to reduce the possibility of collisions in the EDCA mechanism especially in the high dense deployment situation. The OFDMA channel access divides a channel into multiple sub-channels, or called Resource Units (RUs), each of them can be used for a station to carry a frame for UL transmission. As the OFDMA sub-channels are orthogonal, it would be no interference if different stations transmit PPDUs over different OFDMA sub-channels. Therefore, OFDMA channel access increases the contention dimension from the time domain to the frequency domain.

The OFDMA random channel access starts from the trigger frame sent by the AP. When the AP is going to start OFDMA random channel access procedure, it uses the EDCA mechanism to contend the medium. The AP may adjust the EDCA parameters, such as AP contention windows setting, by itself according to the conditions such as the ratio of number of legacy stations versus high efficiency stations (such as the integrated OFDMA-EDCA), traffic loading/congestion, QoS policy, etc. If the AP acquires the medium with EDCA, it sends a trigger frame to indicate the following transmission opportunity is for OFDMA based channel access. When stations receive the trigger frame, they start UL MU transmissions in the SIFS time after receiving the trigger frame to contend the medium in the OFDMA sub-channel domain. As the channel is divided into multiple sub-channels, the OFDMA based channel access could allow multiple stations to simultaneously transmit UL frames over allocated sub-channels in the single contention period. For example, if N OFDMA sub-channels are allocated in the operating frequency bandwidth, the possibility of collisions for OFDMA based channel access would be reduced to 1/N.

On the station side, the integrated OFDMA-EDCA mechanism allows the station to perform both OFDMA and EDCA channel access processes at the same time, but sharing the same backoff scheme: the OFDMA channel access mechanism applies backoff process in the OFDMA sub-channel domain, while EDCA channel access mechanism applies the backoff process on the time slot domain. Both mechanisms may use the same backoff counter (BOC) during the backoff procedure. Therefore it would help to reduce the backoff time comparing so that the two channel access mechanisms are operated independently.

FIG. 3B shows an example of backoff process of integrated OFDMA-EDCA in the time slot domain.

Both AP and STAs monitor the medium for acquiring the channel using contention window parameters. The contention window sizes of AP and STAs could be same or different, depending on AP's configuration. The AP only needs to broadcast the contention window parameters of stations. When both AP and STAs sense that the medium becomes idle, they start the backoff mechanisms.

For the OFDMA random access, the AP starts EDCA backoff procedure for transmitting a trigger frame. If the AP acquires the medium prior to STAs, e.g., its BOC reaches 0 before any BOC of STAs, the AP transmits the trigger frame to trigger the OFDMA based random channel access procedure.

An STA also starts EDCA backoff procedure by assigning BOC(AC) for the access type of PDDUs to be sent, and senses the medium. If the STA senses that the medium is idle for aSlotTime time, for example, using the clear channel assessment (CCA) mechanism, the STA decreases the BOC (AC) by one and continues sensing the medium till the BOC(AC) reaches 0. Once the BOC(AC)<=0, the STA will perform UL SU transmission. If the STA detects the medium busy, the STA would decode the received PPDU to find whether it is a trigger frame.

If the STA receives the trigger frame for random access, it would perform the OFDMA based random channel access. In performing OFDMA channel access, the station decreases the BOC(AC) by the number of allocated RUs for the OFDMA channel access. If the BOC(AC) is equal to or less than 0, then the station starts to transmit the UL PPDU. Otherwise, the station continues to sense the medium for EDCA procedure or wait for the next trigger frame for OFDMA channel access.

If the PPDU is not addressed to it, the STA will continue sensing the medium until the medium becomes idle and decreases the BOC(AC) if the idle time is aSlotTime. If the BOC(AC) reaches to 0 due to the idle channel, the STA will transmit the SU PPDU over the operating channel. In this way, a STA may share the same BOC(AC) for both EDCA and OFDMA random channel access process and integrate two channel access mechanisms seamlessly together so as to get the earliest transmission opportunity for the time sensitive applications.

Figure 4:
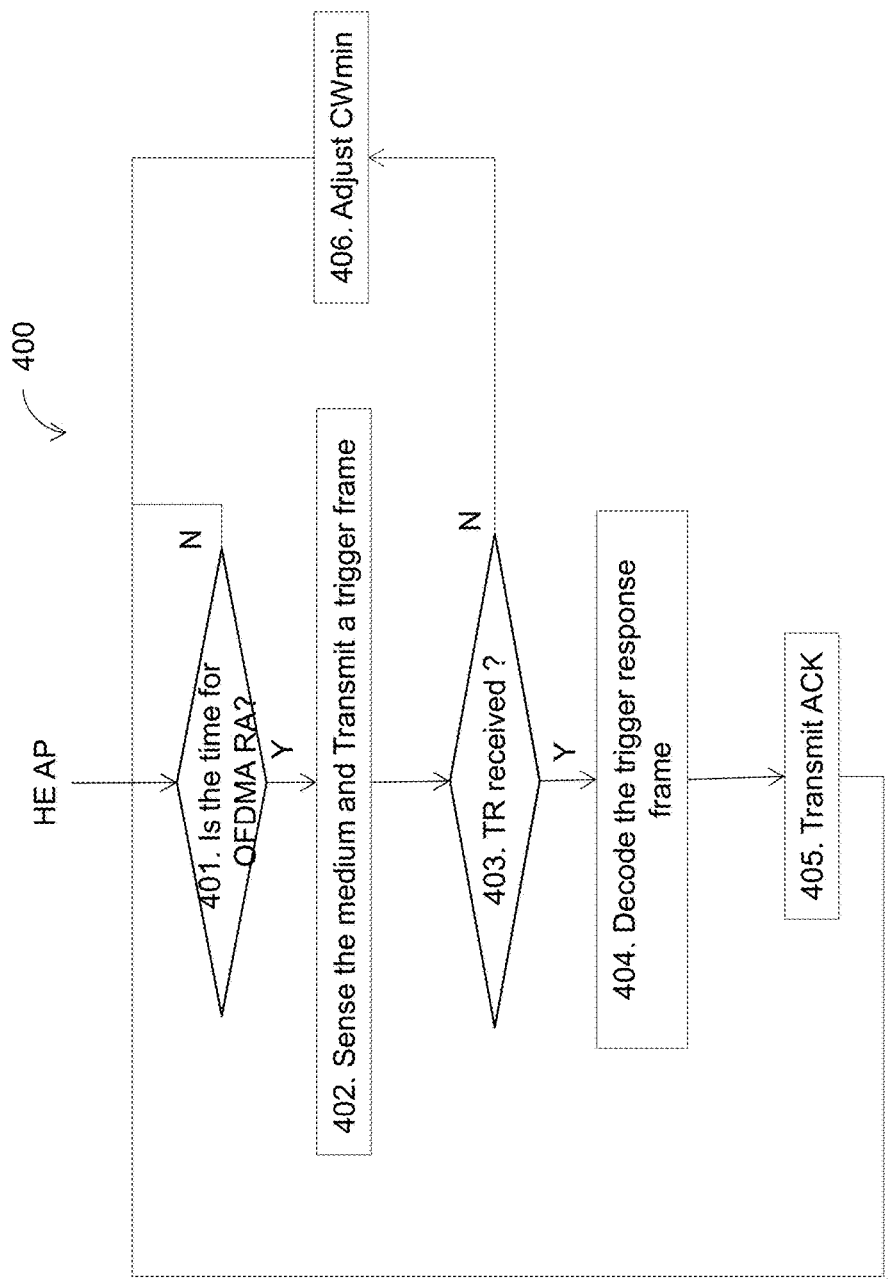
FIG. 4 shows an example of an integrated OFDMA-EDCA random access procedure for AP.

FIG. 4 illustrates an example of the OFDMA channel access procedure 400 for AP.

At operation 401, the AP may broadcast the CWmin and CWmax information in the beacon frame. If AP only broadcast one set of contention window (CW) information, this set of CW information may be shared by both EDCA and OFDMA procedure. If the AP broadcast two sets of CW information, then one set of contention window (CW) parameters may be for legacy stations and the other set may be for high-efficiency (HE) stations.

At operation 401, the AP determines whether or not the next transmission time is for OFDMA based channel access based on, for example,
 a) the time of scheduled OFDMA channel access,
 b) the traffic load of legacy stations and HE stations,
 c) the ratio of numbers of associated legacy stations vs HE stations or
 d) other QoS and fairness policy.

For the scheduled OFDMA channel access, the AP broadcasts the target trigger transmission time in the beacon frame for STAs to determine the receiving time of trigger frame for OFDMA channel access. For OFDMA channel access triggered by other conditions, the AP can send the trigger frame in single frame, or jointly with other frame transmission such as data frame or management frame.

The AP may include the contention window parameters, like CWmin and/or CWmax for each access category in the beacon frame. The contention window parameters could be same for both legacy stations and HE stations, or separated for legacy stations and HE stations respectively. If only one set of contention window parameters is broadcast in the beacon frame, then this set contention window parameters is used for both types of stations. Otherwise, if the AP broadcast two sets of contention window parameters in beacon frames, one set of contention window parameters is for legacy stations only, and the other set of parameters is used for HE stations, for example, the station with capable of performing integrated OFDMA-EDCA random channel access.

At operation 402, if the upcoming transmission time is for OFDMA random access, the AP resets the BOC of EDCA to a random value in [0, CW], where CW is the contention window for the AP, and starts to sense the medium. If the medium is not idle, the AP should keep BOC value and continue monitoring the medium until it is idle. If the medium is sensed as idle for aSlotTime time, the AP decreases its BOC by one. If the BOC is not 0, the AP continues sensing the medium. Otherwise if the BOC=0, the AP transmits the trigger frame for OFDMA random channel access that may include the following fields:

a) AID: If the association identifier (AID) field is set to AIDinit, it means the OFDMA channel access is for the initial channel access associated with following information. If this field is set to AIDretx, it means the OFDMA channel access opportunity is for the retransmission with the following information. If the trigger frame only contains AIDinit, then the following information is allowed to use for either initial OFDMA channel access transmission or OFDMA based channel access retransmissions.

b) CWmin and CWmax. This is optional information field, which may be used for AP to provide the latest CW information for HE stations to replace values in the broadcast beacon frame to fast adapt to the traffic congestion condition. If a STA receives this information in trigger frame, it replaces the stored CWmin and CWmax parameters and use them for coming channel access.

c) AC type: this field would be an optional field and used to indicate the access category (AC) of OFDMA random channel access.

d) Duration: the AP can estimate the transmit time for MAC sublayer Protocol Data Units (MPDU) of trigger frame and duration of for the requested OFDMA channel access, and set the value in this field. All the STAs that perform the OFDMA channel access finishes their OFDMA access transmissions at time indicated by the Duration.

e) RU field: the sub-channel used for STA to send UL PPDU for OFDMA channel access.

The AP may duplicate the trigger frame for OFDMA random access over multiple 20 MHz channels.

At operation 403, after transmitting a trigger frame, the AP switches to receiving mode and monitors the operating channel for receiving trigger response frames from STAs.

At operation 404, the AP decodes the trigger response frames. For example, if the AP detects preamble over the operating channel at operation 403, then at operation 404, it will decode the trigger response frames by decoding the PPDUs over the RU sent by the STA.

At operation 405, if the AP decodes the PPDU over the specified RU successfully, it responds to the STA with ACK or BA in either HE MU PPDU format on the RU that UL PPDU is received, or MU ACK over the entire operating channel. If the AP does not decode the PPDU over the RU successfully, it may ignore the transmission on that RU, or transmit a NACK over that RU. If the AP receives the channel access PPDU from an un-associated station, the AP may assign a temporary AID to the station in the ACK, or BA.

At operation 406, if the AP does not receive a preamble after SIFS time that the trigger was sent or fails to decode all the trigger response over RUs, it may adjust the CWmin and CWmax sizes in either beacon frames or trigger frames for future OFDMA channel access.

Figure 5:
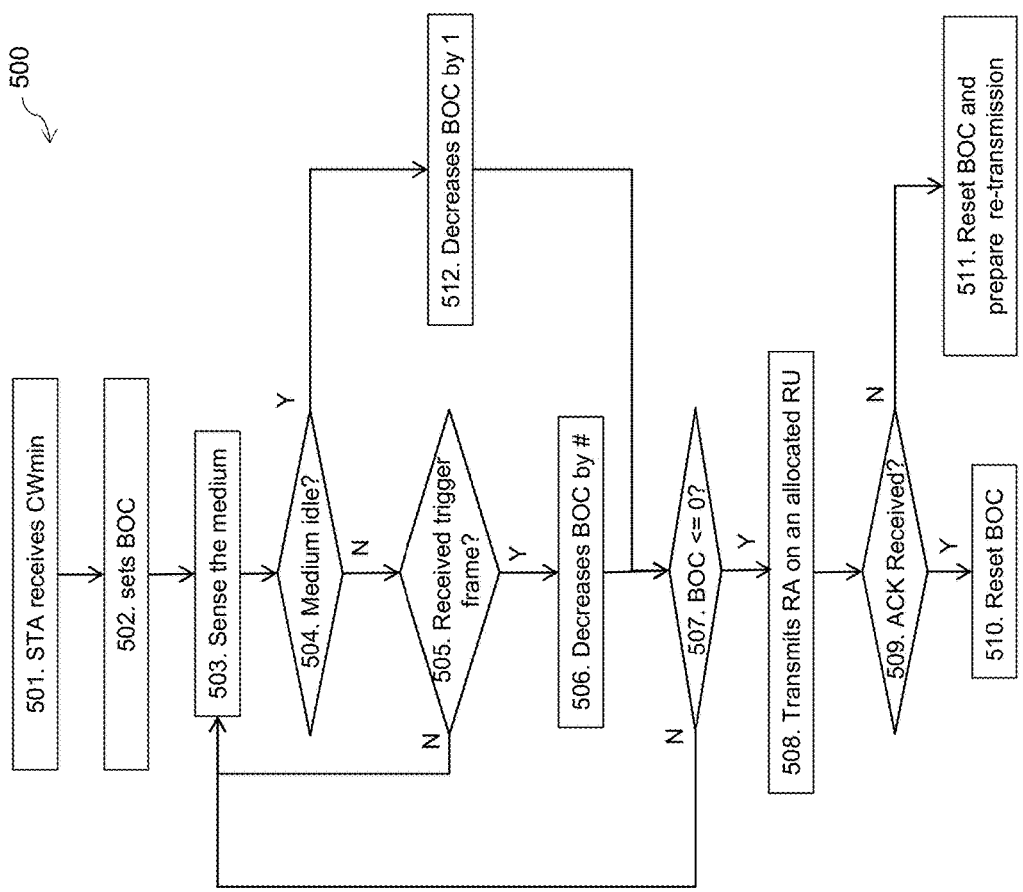
FIG. 5 shows an example of an integrated OFDMA-EDCA random access procedure for STA.

FIG. 5 shows an example of the integrated OFDMA-EDCA channel access procedure for STA. A STA may maintain four backoff counters BOC(AC) for different access category (AC) of buffered data:

AC=[Background (i.e. BG), Best Effort (i.e. BE), Video (i.e. VI), Voice (i.e. VO)].

BOC(AC) are used and shared by both EDCA and OFDMA channel access mechanisms for the fast acquisition of medium. The EDCA channel access mechanism updates the BOC(AC) according the measured idle time in the time domain, while the OFDMA random channel access mechanism updates the BOC(AC) according to the number of RUs received in the trigger frame. Therefore, no matter what mechanisms make BOC(AC) to reach 0, the station would be able to acquire the medium in the earliest opportunity, especially for the short burst data transmission, and/or time sensitive application data transmission.

At operation 501, the STA receives the contention window parameters from a beacon frame. The contention window parameters include a minimum contention window value.

At operation 502, a STA sets a random value for BOC (AC) for access category of UL PPDU:

BOC(AC)=a random value of [0, CW[AC]], where CW[AC] is the contention window for the AC, initialized at CWmin for that access category. CWmin is the minimum contention window size received previously.

The STA sets the Random Access Flag (RAF) to EDCA.

At operation 503, the STA may start to sense the medium.

At operation 504, if the medium is sensed as busy, the STA keeps the value of BOC(AC), starts decoding the PPDU and goes to operation 505. Otherwise, if the medium is sensed as idle for aSlotTime, it goes to operation 512. At operation 512, the STA decreases the BOC(AC) by 1, sets the RAF to EDCA and then goes to operation 507.

At operation 505, if the STA receives a trigger frame for OFDMA random channel access, it goes to operation 506. Otherwise if it is not a trigger frame, it goes back to operation 503 to continue sensing the medium.

At operation 506, the STA decreases the BOC(AC) by the RUs specified in the trigger frame, and sets RAF to OFDMA.

At operation 507, if the BOC(AC)>0, The STA goes to operation 503 to continue sensing the medium. Otherwise, it goes to operation 508.

At operation 508, if the BOC(AC)<=0 and RAF=OFDMA, the STA sends MU PPDU to AP over a randomly selected RU among allocated RUs in the trigger frame.

If the BOC(AC)=0 and RAF=EDCA, the STA sends the SU PPDU to AP over the entire operating channel.

At operation 509, after sending PPDUs to AP, the STA then switches to the receiving mode to monitor the response from the AP for the acknowledgement.

At operation 510, if the STA receives the ACK from the AP about its UL transmission, it will reset the BOC(AC) and continue monitoring. If the STA is un-associated station with the BSS and the ACK (or BA) includes the temporary AID, the STA uses the temporary AID for the consequent channel access to the BSS.

Otherwise, if the STA does not receive the ACK from the AP for its UL transmission, then at operation 511, the STA may double the CW[AC], reset the BOC(AC) value from [0, CW[AC]] and goes to operation 503 to prepare retransmission.

Figure 6:
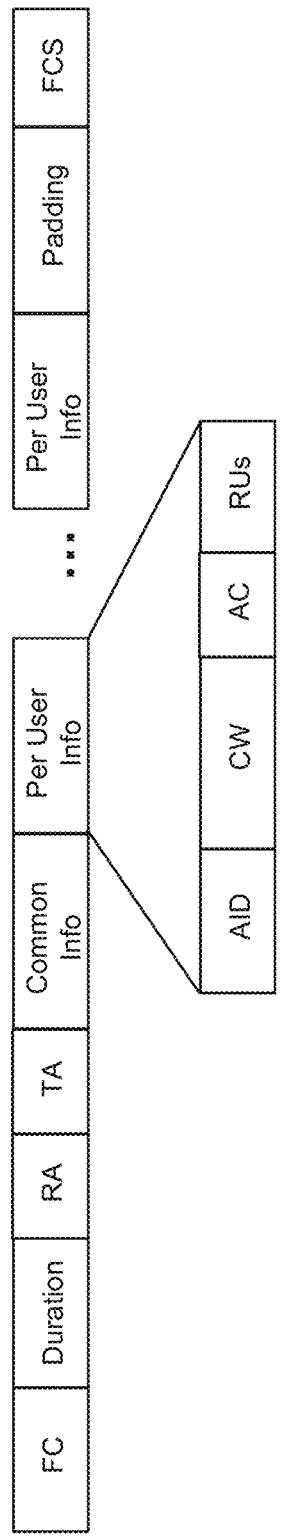
FIG. 6 shows an example of trigger frame format for OFDMA random access.

FIG. 6 shows an example of trigger frame format for OFDMA base channel access. The trigger frame may contain:

A) AID field: indicating the OFDMA channel access.
B) CWs field: carrying CWmin and/or CWmax per access category.
C) AC field: the specified access category for the OFDMA channel access.
D) RU field: indicating the OFDMA sub-channels that are used for the OFDMA channel access.

Figure 7:
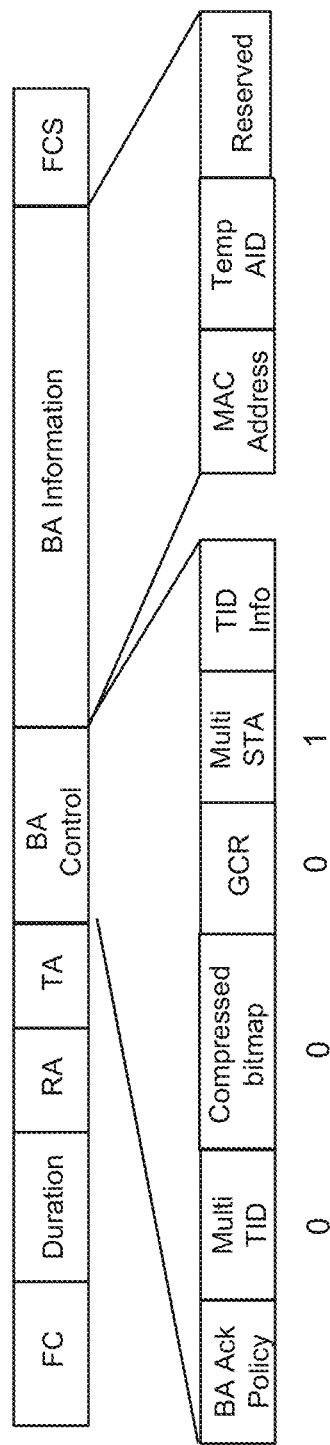
FIG. 7 shows an example of block acknowledgement for OFDMA based channel access with AID assignment to un-associated station.

FIG. 7 shows an example of block acknowledgement for OFDMA based channel access with AID assignment to un-associated station.

When the AP decodes the OFDMA channel access, e.g., Association Request, Probe Request, etc., from an un-associated station over the allocated RU successfully, it may use the acknowledgement, such as BA, to OFDMA channel access to assign a temporary AID to the un-associated station. The BA control frame may include:

A) BA control field: this field is to control the BA information field. It may be set to the indication of acknowledgement for un-associated station with temporary AID, like 0, 0, 0, 1 for Muti-TID, Compressed Bitmap, GCR and Multi-STA sub-field respectively.
B) BA information field: this field is to carry the BA information. For the BA variance in response of un-associated station, the BA information may contain MAC address of the un-associated station and temporary AID assigned by AP to the station.

Figure 8:
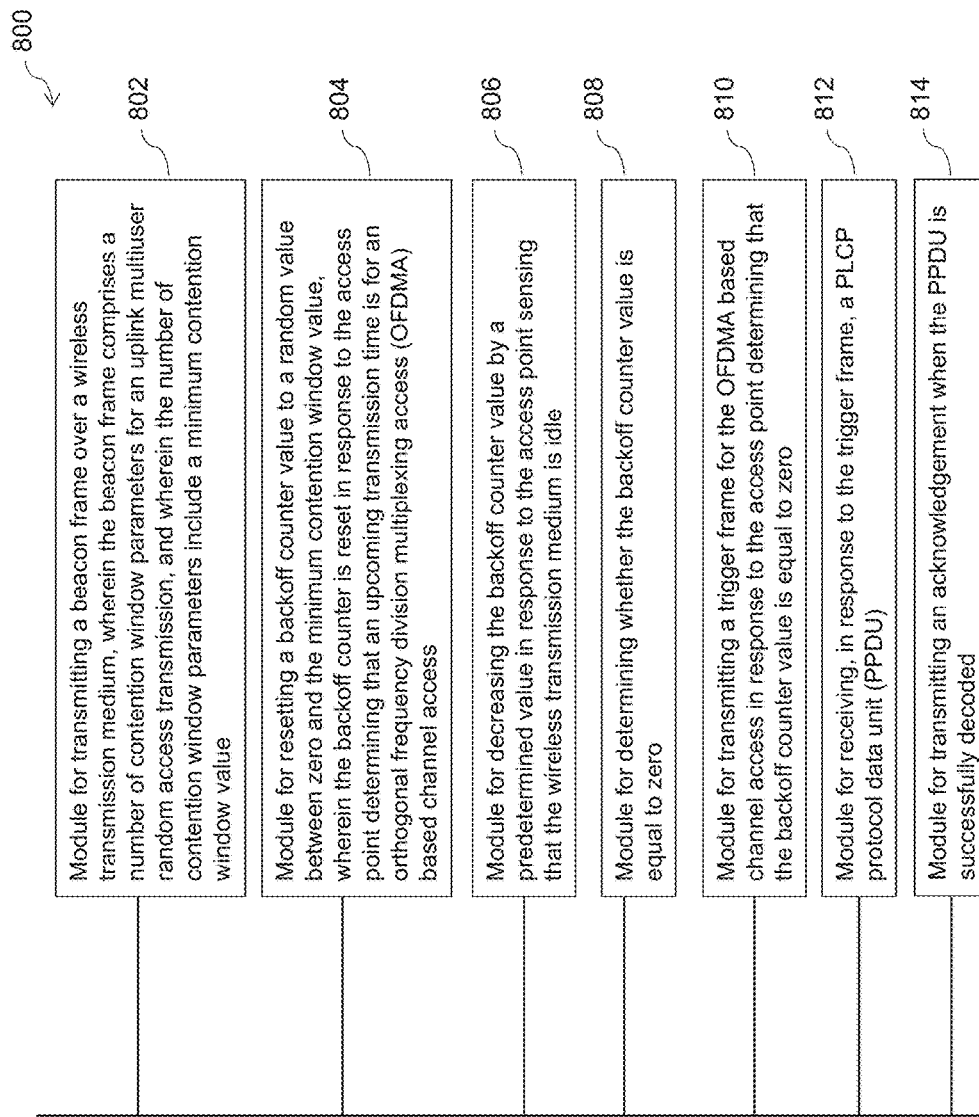
FIG. 8 shows a block diagram for an exemplary access point.

FIG. 8 shows a block diagram 800 for an exemplary access point. The exemplary access point comprises a processor and a memory having instructions stored thereupon. In 802, the instructions upon execution by the processor configures the access point to transmit a beacon frame over a wireless transmission medium, wherein the beacon frame comprises a number of contention window parameters for an uplink multiuser random access transmission, and wherein the number of contention window parameters include a minimum contention window value. In 804, the access point is configured to reset a backoff counter value to a random value between zero and the minimum contention window value, wherein the backoff counter is reset in response to the access point determining that an upcoming transmission time is for an orthogonal frequency division multiplexing access (OFDMA) based channel access. In 806, the access point is configured to decrease the backoff counter value by a predetermined value in response to the access point sensing that the wireless transmission medium is idle. In 808, the access point is configured to determine whether the backoff counter value is equal to zero. In 810, the access point is configured to transmit a trigger frame for the OFDMA based channel access in response to the access point determining that the backoff counter value is equal to zero. In 812, the access point is configured to receive, in response to the trigger frame, a PLCP protocol data unit (PPDU). In 814, the access point is configured to transmit an acknowledgement when the PPDU is successfully decoded.

Figure 9:
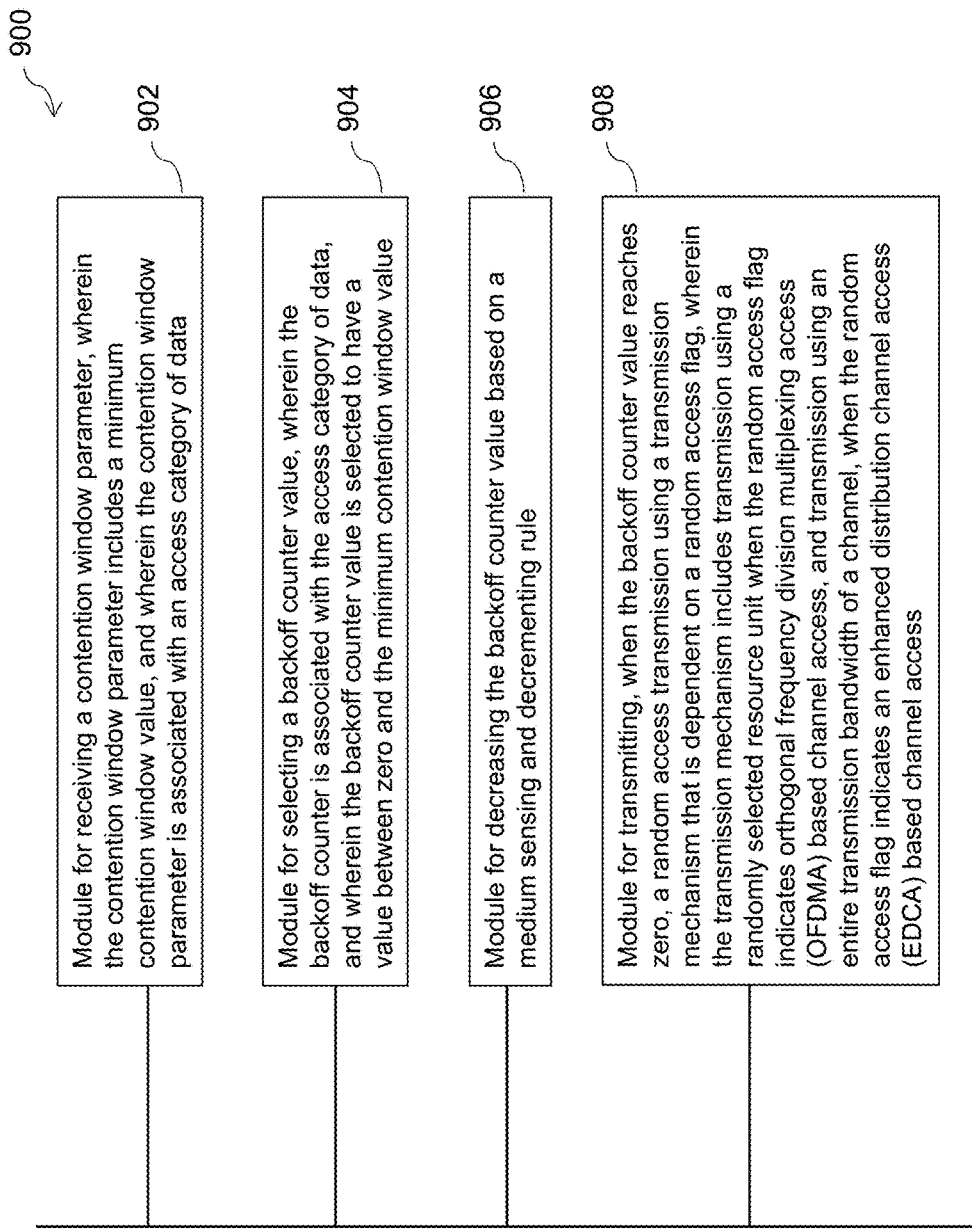
FIG. 9 shows a block diagram for an exemplary wireless station.

FIG. 9 shows a block diagram 900 for an exemplary wireless station. The exemplary wireless station, comprises a processor and a memory having instructions stored thereupon. In 902, the instructions upon execution by the processor configures the wireless station to receive a contention window parameter, wherein the contention window parameter includes a minimum contention window value, and wherein the contention window parameter is associated with an access category of data. In 904, the wireless station is also configured to select a backoff counter value, wherein the backoff counter is associated with the access category of data, and wherein the backoff counter value is selected to have a value between zero and the minimum contention window value. In 906, the wireless station is configured to decrease the backoff counter value based on a medium sensing and decrementing rule. In 908, the wireless station is configured to transmit, when the backoff counter value reaches zero, a random access transmission using a transmission mechanism that is dependent on a random access flag, wherein the transmission mechanism includes transmission using a randomly selected resource unit when the random access flag indicates orthogonal frequency division multiplexing access (OFDMA) based channel access, and transmission using an entire transmission bandwidth of a channel, when the random access flag indicates an enhanced distribution channel access (EDCA) based channel access.

Accordingly, a wireless communication method implemented by an AP, using the technology described in this document, may include transmitting, by the access point, a beacon frame over a wireless transmission medium, wherein the beacon frame comprises a number of contention window parameters for an uplink multiuser random access transmission, and wherein the number of contention window parameters include a minimum contention window value; resetting, by the access point, a backoff counter value to a random value between zero and the minimum contention window value, wherein the backoff counter is reset in response to the access point determining that an upcoming transmission time is for an orthogonal frequency division multiplexing access (OFDMA) based channel access; decreasing, by the access point, the backoff counter value by a predetermined value in response to the access point sensing that the wireless transmission medium is idle; determining, by the access point, whether the backoff counter value is equal to zero; transmitting, by the access point, a trigger frame for the OFDMA based channel access in response to the access point determining that the backoff counter value is equal to zero; receiving, in response to the trigger frame, a PLCP protocol data unit (PPDU); and transmitting an acknowledgement when the PPDU is successfully decoded.

A wireless transmission method implemented by a wireless station using the technology described in the present document includes receiving, by the wireless station, a contention window parameter, wherein the contention window parameter includes a minimum contention window value, and wherein the contention window parameter is associated with an access category of data, selecting, by the wireless station, a backoff counter value, wherein the backoff counter is associated with the access category of data, and wherein the backoff counter value is selected to have a value between zero and the minimum contention window value, decreasing, by the wireless station, the backoff counter value based on a medium sensing and decrementing rule, and transmitting, when the backoff counter value reaches zero, a random access transmission using a transmission mechanism that is dependent on a random access flag. The transmission mechanism includes transmitting using a randomly selected resource unit when the random access flag indicates orthogonal frequency division multiplexing access (OFDMA) based channel access, and transmitting using an entire transmission bandwidth of a channel, when the random access flag indicates an enhanced distribution channel access (EDCA) based channel access.

Figure 10:
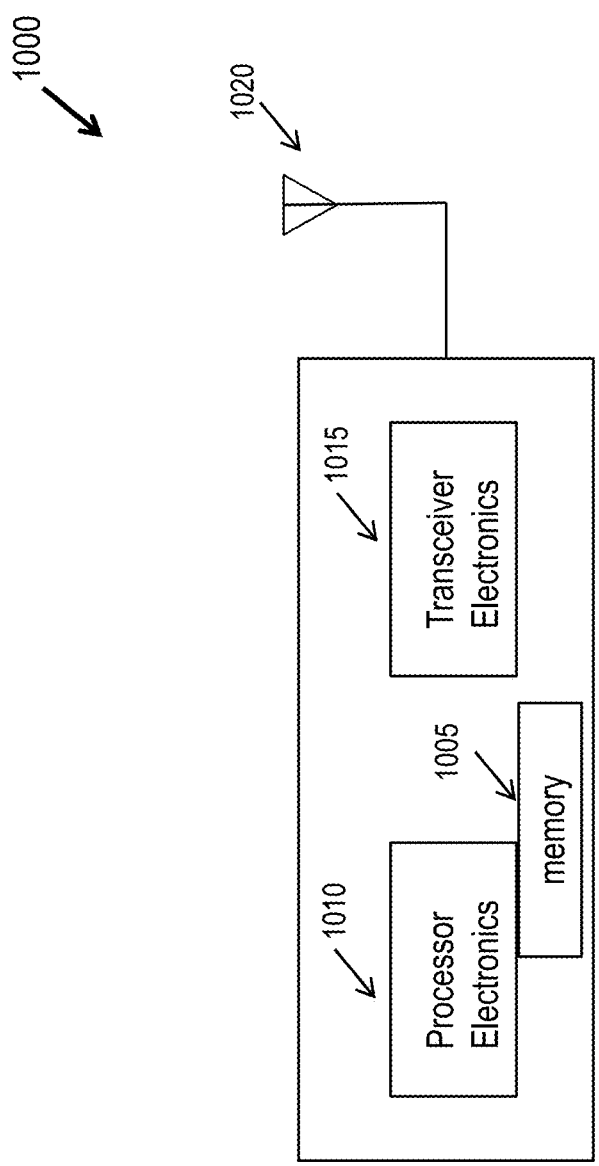
FIG. 10 shows an example wireless communication apparatus.

FIG. 10 depicts an example implementation of a wireless apparatus 1000. The apparatus 1000 may be used to implement various techniques described in the present document. For example, the apparatus 1000 may be implemented on the network-side as an access point or on the user-side as a wireless station or STA. The apparatus 1000 includes one or more antenna 1020 that are used to transmit and/or receive wireless signals. The wireless signals may be processed by transceiver electronics 1015 during the reception or transmission operation. The apparatus 1600 may also include a memory 1005 and processor electronics 1010 for storing and executing code. The memory 1005 may be external or internal to the processor electronics 1010.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of controlling operation of a wireless network comprising an access point, the method comprising:
   transmitting, by the access point, a beacon frame over a wireless transmission medium, wherein the beacon frame comprises a number of contention window parameters for an uplink multiuser random access transmission, and wherein the number of contention window parameters include a minimum contention window value;
   resetting, by the access point, a backoff counter value to a random value between zero and the minimum contention window value, wherein the backoff counter is reset in response to the access point determining that an upcoming transmission time is for an orthogonal frequency division multiplexing access (OFDMA) based channel access;

decreasing, by the access point, the backoff counter value by a predetermined value in response to the access point sensing that the wireless transmission medium is idle;
determining, by the access point, whether the backoff counter value is equal to zero;
transmitting, by the access point, a trigger frame for the OFDMA based channel access in response to the access point determining that the backoff counter value is equal to zero;
receiving, in response to the trigger frame, a physical layer convergence protocol (PLCP) protocol data unit (PPDU); and
transmitting an acknowledgement when the PPDU is successfully decoded.

2. The method of claim 1, wherein the receiving of the PLCP protocol data unit (PPDU) comprises:
monitoring, by the access point, an operating channel to receive trigger response frames from a plurality of wireless stations, wherein each trigger response frame includes a preamble and a PLCP protocol data unit (PPDU);
detecting, by the access point, the preamble over the operating channel; and
decoding, after detecting the preamble, the PPDUs over a resource unit (RU).

3. The method of claim 1, further comprising:
maintaining, by the access point, the backoff counter value in responses to sensing that the wireless transmission is not idle; and
monitoring, by the access point, the wireless transmission medium to determine whether the wireless transmission medium is idle.

4. The method of claim 1, wherein the trigger frame comprises an association identifier (AID), the minimum contention window value, the maximum contention window value, an access category (AC), duration, and resource unit (RU).

5. The method of claim 1, wherein the acknowledgement is a multi-user acknowledgement transmitted over a high-efficiency multi-user PPDU on a resource unit.

6. The method of claim 1, wherein the number of contention window parameters includes a single set of contention window parameters shared by both the enhanced distributed channel access (EDCA) based channel access and the orthogonal frequency division multiplexing access (OFDMA) based channel access.

7. The method of claim 1, further comprising:
duplicating, by the access point, the trigger frame for OFDMA based channel access over multiple 20 MHz channels.

8. The method of claim 1, further comprising:
adjusting, by the access point, the contention window parameters in either beacon frame or trigger frame for future OFDMA based channel access, wherein the adjusting of the contention window parameters is in response to the access point not receiving the preamble after a short interframe space (SIFS) time.

9. An access point, comprising:
a processor and a memory having instructions stored thereupon, wherein the instructions upon execution by the processor configures the access point to:
transmit a beacon frame over a wireless transmission medium, wherein the beacon frame comprises a number of contention window parameters for an uplink multiuser random access transmission, and wherein the number of contention window parameters include a minimum contention window value;
reset a backoff counter value to a random value between zero and the minimum contention window value, wherein the backoff counter is reset in response to the access point determining that an upcoming transmission time is for an orthogonal frequency division multiplexing access (OFDMA) based channel access;
decrease the backoff counter value by a predetermined value in response to the access point sensing that the wireless transmission medium is idle;
determine whether the backoff counter value is equal to zero;
transmit a trigger frame for the OFDMA based channel access in response to the access point determining that the backoff counter value is equal to zero;
receive, in response to the trigger frame, a physical layer convergence protocol (PLCP) protocol data unit (PPDU); and
transmit an acknowledgement when the PPDU is successfully decoded.

10. The access point of claim 9, wherein the instructions upon execution by the processor configures the access point to receive the PLCP protocol data unit (PPDU) by:
monitoring an operating channel to receive trigger response frames from a plurality of wireless stations, wherein each trigger response frame includes a preamble and a PLCP protocol data unit (PPDU);
detecting the preamble over the operating channel; and
decoding, after detecting the preamble, the PPDUs over a resource unit (RU).

11. The access point of claim 9, wherein the instructions upon execution by the processor further configures the access point to:
maintain the backoff counter value in responses to sensing that the wireless transmission is not idle; and
monitor the wireless transmission medium to determine whether the wireless transmission medium is idle.

12. The access point of claim 9, wherein the trigger frame comprises an association identifier (AID), the minimum contention window value, the maximum contention window value, an access category (AC), duration, and resource unit (RU).

13. The access point of claim 9, wherein the acknowledgement is a multi-user acknowledgement transmitted over a high-efficiency multi-user PPDU on a resource unit.

14. The access point of claim 9, wherein the number of contention window parameters includes a single set of contention window parameters shared by both the enhanced distributed channel access (EDCA) based channel access and the orthogonal frequency division multiplexing access (OFDMA) based channel access.

15. The access point of claim 9, wherein the instructions upon execution by the processor further configures the access point to:
duplicate the trigger frame for OFDMA based channel access over multiple 20 MHz channels.

16. The access point of claim 9, wherein the instructions upon execution by the processor further configures the access point to:
adjust the contention window parameters in either beacon frame or trigger frame for future OFDMA based channel access, wherein the adjusting of the contention window parameters is in response to the access point not receiving the preamble after a short interframe space (SIFS) time.

17. A method of wireless communication, the method comprising:
- receiving, by a wireless station, a contention window parameter, wherein the contention window parameter includes a minimum contention window value, and wherein the contention window parameter is associated with an access category of data;
- selecting, by the wireless station, a backoff counter value, wherein the backoff counter is associated with the access category of data, and wherein the backoff counter value is selected to have a value between zero and the minimum contention window value;
- decreasing, by the wireless station, the backoff counter value based on a medium sensing and decrementing rule; and
- transmitting, when the backoff counter value reaches zero, a random access transmission using a transmission mechanism that is dependent on a random access flag, wherein the transmission mechanism includes
  - transmitting using a randomly selected resource unit when the random access flag indicates orthogonal frequency division multiplexing access (OFDMA) based channel access, and
  - transmitting using an entire transmission bandwidth of a channel, when the random access flag indicates an enhanced distribution channel access (EDCA) based channel access.

18. The method of claim 17, further comprising:
resetting, by the wireless station, the backoff counter in response to receiving an acknowledgement from an access point.

19. The method of claim 17, wherein the medium sensing and decrementing rule for decreasing the backoff counter value comprises:
- sensing, by the wireless station, the wireless transmission medium;
- maintaining, by the wireless station, the backoff counter value in response to determining that the wireless transmission medium is busy;
- decoding, by the wireless station, a physical layer convergence protocol (PLCP) protocol data unit (PPDU) in response to determining that the wireless transmission medium is busy;
- receiving, by the wireless station, a trigger frame for orthogonal frequency division multiplexing access (OFDMA) based channel access, the trigger frame comprising a number of allocated resource units;
- decreasing, by the wireless station, the backoff counter value by the number of allocated resource units; and
- setting, by the wireless station, the random access flag to indicate OFDMA based channel access.

20. The method of claim 17, wherein the medium sensing and decrementing rule for decreasing the backoff counter value comprises:
- sensing, by the wireless station, the wireless transmission medium;
- decreasing, by the wireless station, the backoff counter value by a predetermined value in response to determining that the wireless transmission medium is not busy; and
- setting, by the wireless station, the random access flag to indicate EDCA based channel access.

21. The method of claim 17, wherein the access category of data includes any one of a background, a best effort, a video, and a voice.

22. The method of claim 17, further comprising:
- setting, by the wireless station, a new contention window parameter to twice that of a previous contention window parameter, wherein the setting of the new contention window is in response to not receiving an acknowledgement from an access point;
- resetting the backoff counter after setting the new contention window parameter; and
- sensing the wireless transmission medium after resetting the backoff counter.

23. A wireless station, comprising:
a processor and a memory having instructions stored thereupon, wherein the instructions upon execution by the processor configure the wireless station to:
- receive a contention window parameter, wherein the contention window parameter includes a minimum contention window value, and wherein the contention window parameter is associated with an access category of data;
- select a backoff counter value, wherein the backoff counter is associated with the access category of data, and wherein the backoff counter value is selected to have a value between zero and the minimum contention window value;
- decrease the backoff counter value based on a medium sensing and decrementing rule; and
- transmit, when the backoff counter value reaches zero, a random access transmission using a transmission mechanism that is dependent on a random access flag, wherein the transmission mechanism includes
  - transmission using a randomly selected resource unit when the random access flag indicates orthogonal frequency division multiplexing access (OFDMA) based channel access, and
  - transmission using an entire transmission bandwidth of a channel, when the random access flag indicates an enhanced distribution channel access (EDCA) based channel access.

24. The wireless station of claim 23, wherein the instructions upon execution by the processor further configure the wireless station to:
reset the backoff counter in response to receiving an acknowledgement from an access point.

25. The wireless station of claim 23, wherein the instructions for medium sensing and decrementing rule for decreasing the backoff counter value upon execution by the processor configure the wireless station to:
- sense the wireless transmission medium;
- maintain the backoff counter value in response to determining that the wireless transmission medium is busy;
- decode a physical layer convergence protocol (PLCP) protocol data unit (PPDU) in response to determining that the wireless transmission medium is busy;
- receive a trigger frame for orthogonal frequency division multiplexing access (OFDMA) based channel access, the trigger frame comprising a number of allocated resource units;
- decrease the backoff counter value by the number of allocated resource units; and
- set the random access flag to indicate OFDMA based channel access.

26. The wireless station of claim 23, wherein the instructions for medium sensing and decrementing rule for decreasing the backoff counter value upon execution by the processor configure the wireless station to:

sense the wireless transmission medium;

decrease the backoff counter value by a predetermined value in response to determining that the wireless transmission medium is not busy; and set the random access flag to indicate EDCA based channel access.

27. The wireless station of claim 23, wherein the access category of data includes any one of a background, a best effort, a video, and a voice.

28. The wireless station of claim 23, wherein the instructions upon execution by the processor further configure the wireless station to:

set a new contention window parameter to twice that of a previous contention window parameter, wherein the setting of the new contention window is in response to not receiving an acknowledgement from an access point;

reset the backoff counter after setting the new contention window parameter; and sense the wireless transmission medium after resetting the backoff counter.

\* \* \* \* \*